(No Model.) 3 Sheets—Sheet 2.
C. BROEG.
MEAT CUTTER.
No. 517,377. Patented Mar. 27, 1894.
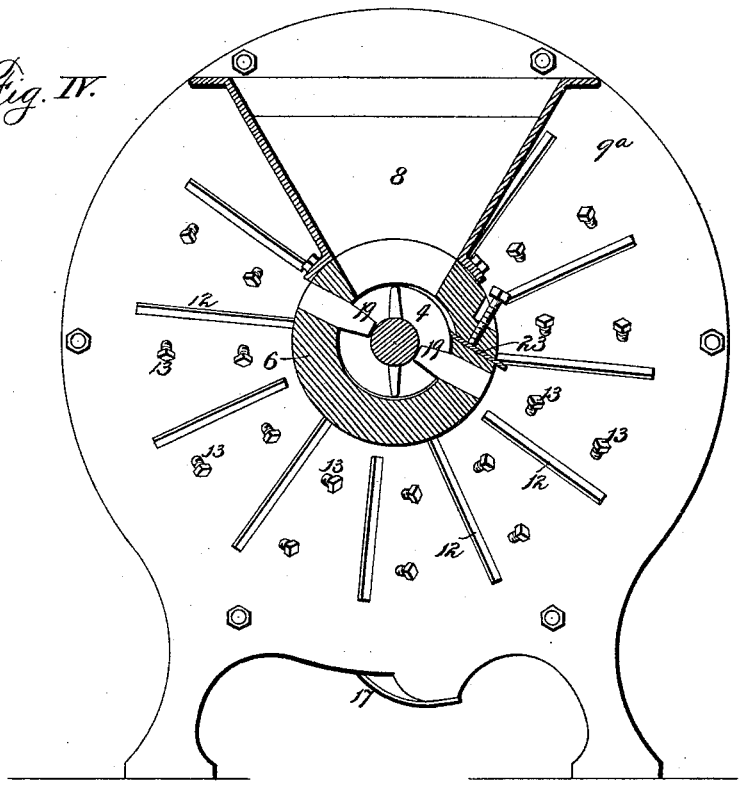
Fig. IV.
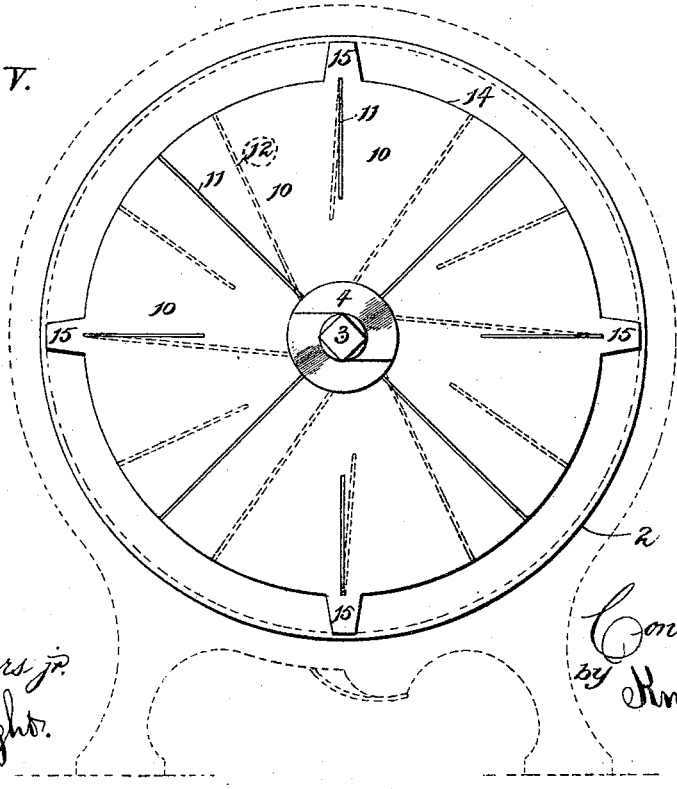
Fig. V.
Attest:
John Enders Jr.
Benj. A. Knight.
Inventor
Conrad Broeg.
by Knight Bro's.
Att'ys.

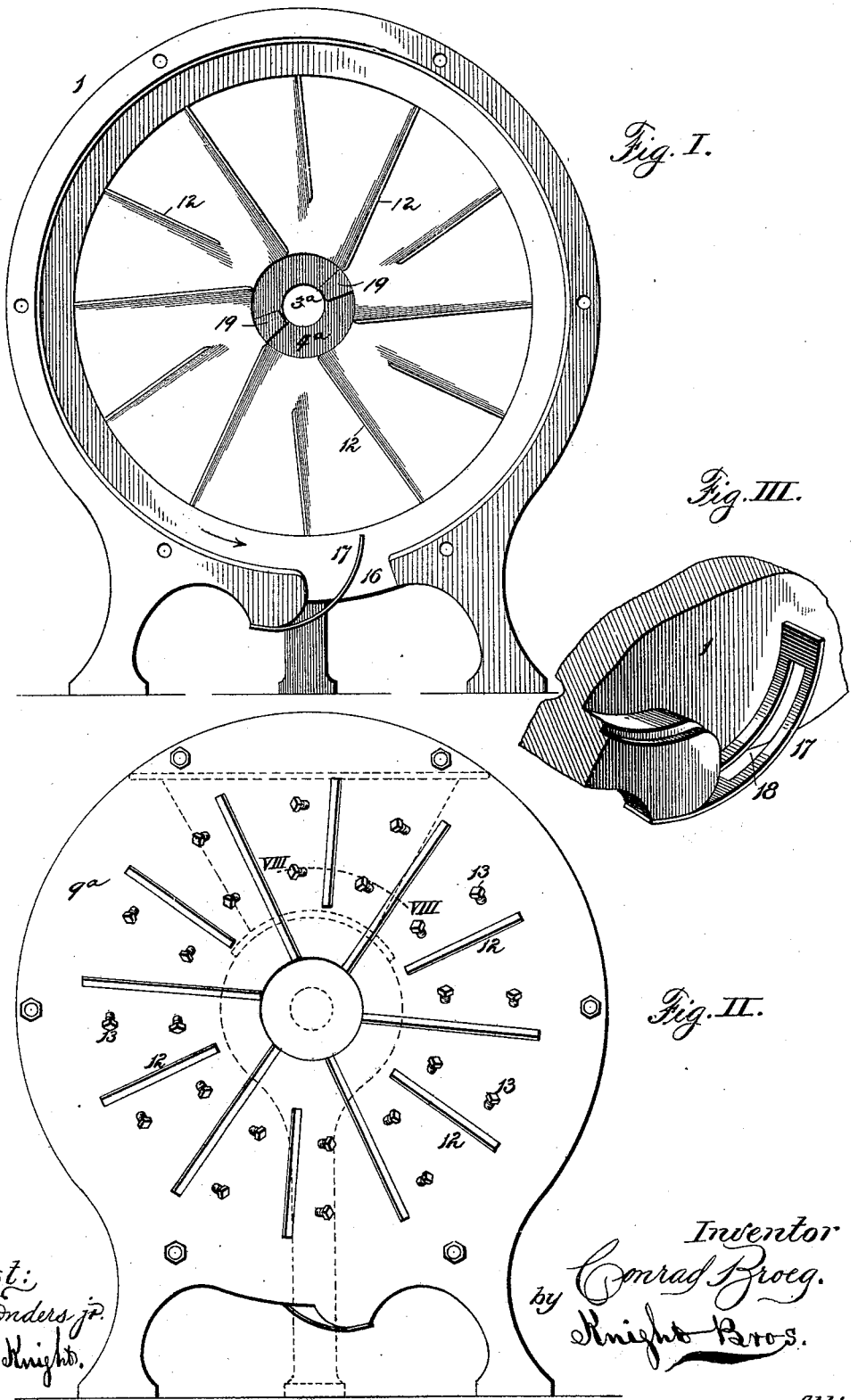

(No Model.) 3 Sheets—Sheet 3.
C. BROEG.
MEAT CUTTER.
No. 517,377. Patented Mar. 27, 1894.
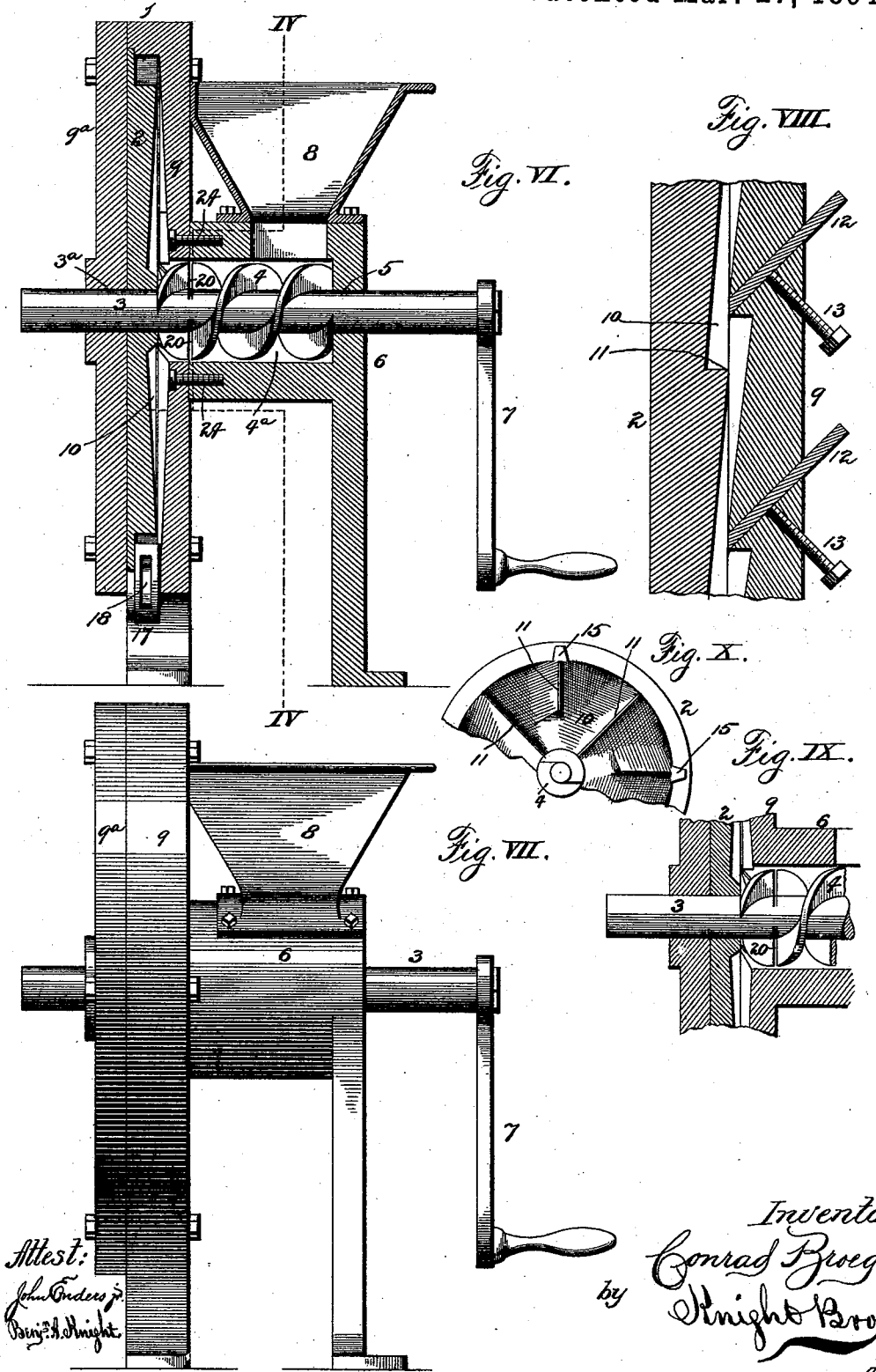

UNITED STATES PATENT OFFICE.

CONRAD BROEG, OF ST. LOUIS, MISSOURI.

MEAT-CUTTER.

SPECIFICATION forming part of Letters Patent No. 517,377, dated March 27, 1894.

Application filed September 19, 1893. Serial No. 485,738. (No model.)

*To all whom it may concern:*

Be it known that I, CONRAD BROEG, of the city of St. Louis, in the State of Missouri, have invented a certain new and useful Improvement in Meat-Cutters, of which the following is a full, clear, and exact description, reference being had to the accompanying drawings, forming part of this specification.

My invention relates to certain improvements in a machine for cutting meat; and my invention consists in features of novelty hereinafter fully described and pointed out in the claims.

Figure I is an elevation of my improved machine, with one side of the casing or housing removed. Fig. II is a side elevation with the hopper, the conveyer and the conveyer housing removed. Fig. III is an enlarged, detail, perspective view, showing the discharge opening, and scraper of the machine. Fig. IV is a vertical section, taken on line IV—IV, Fig. VI. Fig. V is an elevation of the machine, with the side of the housing removed; this view showing the opposite side of the machine from that shown in Fig. I. Fig. VI is a vertical section through the machine, taken lengthwise of the conveyer, and showing the conveyer in elevation. Fig. VII is a side elevation of the machine. Fig. VIII is an enlarged, detail view of the knife carrier, and the furrow disk. Fig. IX is a detail view, showing the conveyer housing and the knife carrying plate formed in one piece. Fig. X is a detail view, showing the form of the furrows and lands of the disk.

Referring to the drawings, 1 represents a housing, having a cavity or chamber, receiving a plate or disk 2, secured to the shaft 3 of a screw conveyer 4. The shaft 3 is journaled at 3ª in one side of the disk housing, and at 5 in the housing 6.

7 represents a crank by which the shaft, the screw 4 and the disk 2 are turned. Over the conveyer housing 6 is a hopper 8, through which the meat is fed onto the conveyer 4, which carries it into the machine between the disk 2, and the side 9 of the housing 1. The surface of the disk 2, which faces the side 9 of the housing 1, is provided with furrows 10, the lands 11 of which extend radially from the center of the disk. The furrows are made deepest at the inner corner of each land, and taper from this point outwardly to the periphery of the disk, and toward the next land, as illustrated in the detail view, Fig. X. Part of the furrows extend from the periphery entirely to the center of the disk, while others extend from the periphery part way to the center, as shown in Fig. V. The part 9 of the housing 1 is provided with knives or cutters 12, preferably held in place by means of set screws 13, and which are arranged so as not to be parallel with the lands of the furrows, or, in other words, eccentrically to a radial arrangement, so that as the disk 2 is turned by the shaft 3, the meat is cut by a shearing action between the lands of the furrows and the stationary knives. As the disk 2 revolves and carries the meat against the edge of the knives, the meat gradually works outward along the furrows to the periphery 14 of the disk, and is there carried around by projections 15 on the disk to the discharge opening 16 of the machine, where it falls in the receptacle placed to receive it. For the purpose of causing a forced discharge of the cut meat, I secure a spring scraper 17 across the opening 16, and against the inner end of which the meat impinges and is forced outwardly along the spring, the spring being provided with an opening 18 to permit the passage of the meat.

19 represents cutters which project into the chamber 4ª of the conveyer 4. The inner ends of these cutters are received by slits 20 in the conveyer flights, and the object of these cutters is to sever the meat into chunks as it passes into the machine, and should it be desired to cut the meat into chunks only, the head 9ª of the housing 1, and the disk 2, might be removed, to permit the meat to fall from the machine directly after it leaves the conveyer.

23 represents a knife arranged in the conveyer housing, and which projects into the screw chamber, in close proximity to the periphery of the conveyer flights, the function of this knife is to cut any strings or threads of meat which may overlap the flights, and thus prevent the machine from choking. This knife 23 is best shown in Fig. IV.

In Fig. IX, I have shown the side 9 of the housing, and the housing of the conveyer formed integral, while in Fig. VI, I have shown these parts connected by screws 24.

I claim as my invention—

1. In a meat cutting machine, the combination of the housing 1, the shaft 3, having the conveyer 4, and carrying the disk 2, said shaft journaled in said housing, said disk being provided with a number of furrows and lands, the said furrows being made deepest at the inner corner of each land and tapering from this point outwardly to the periphery of the disk, and knives secured to the face of the housing 1, adjacent to the furrowed disk substantially as and for the purpose set forth.

2. In a meat cutter, the combination of the housing 1, the shaft 3 having the conveyer 4 and carrying the disk 2 said shaft journaled in said housing, the said disk being provided with land and furrows, the said furrows being deepest at their inner ends and tapering outwardly, and with projections 15 on the periphery of the disk, and knives secured to the face of the housing 1, adjacent to the furrowed disk substantially as and for the purpose set forth.

3. In a meat cutter, the combination of a conveyer, a furrowed disk secured to the shaft of the conveyer, knives secured to the inner face of one side of the housing, projections 15 secured or formed upon the periphery of said disk, and a slotted spring scraper secured across the discharge opening of said housing; substantially as and for the purpose set forth.

4. In a meat cutter, the combination of the housing 1, the shaft 3 having the conveyer 4 and carrying the furrowed disk 2 said shaft journaled in said housing, projections 15 on the periphery of the disk 2, knives secured to the inner face of one side of the housing 1, and a spring scraper secured across the discharge opening of the housing 1, substantially as shown and described.

5. In a meat cutter, the combination of the housing 1, the shaft 3 having the conveyer 4 and carrying the furrowed disk 2 said shaft journaled in said housing, and the knives 12 adjustably secured to the inner face of one side of the housing 1, substantially as shown and described.

CONRAD BROEG.

In presence of—
A. M. EBERSOLE,
G. E. EBERSOLE.